United States Patent [19]

Wistuba

[11] Patent Number: 4,619,413
[45] Date of Patent: Oct. 28, 1986

[54] FORAGE OR PICKING HARVESTER

[75] Inventor: Eberhard Wistuba, Rettenbach, Fed. Rep. of Germany

[73] Assignee: Karl Mengele & Söhne GmbH & Co., Günzburg, Fed. Rep. of Germany

[21] Appl. No.: 554,258

[22] Filed: Nov. 22, 1983

[30] Foreign Application Priority Data

Nov. 22, 1982 [DE] Fed. Rep. of Germany ....... 3243077

[51] Int. Cl.$^4$ ............................................ B02C 18/18
[52] U.S. Cl. ..................... 241/222; 241/239; 241/286
[58] Field of Search ............... 241/55, 239, 240, 241, 241/242, 243, 101.7, 286, 222-224

[56] References Cited

U.S. PATENT DOCUMENTS 3,946,954  3/1976  Sousek .............................. 241/222
4,117,983  10/1978  Browning ............................ 241/55

FOREIGN PATENT DOCUMENTS 7047134  8/1971  Fed. Rep. of Germany .
7038523  4/1972  Fed. Rep. of Germany .
3000946  7/1980  Fed. Rep. of Germany .
2098617  3/1972  France ............................. 241/222
514273  12/1971  Switzerland .
952827  3/1964  United Kingdom .

Primary Examiner—Mark Rosenbaum
Attorney, Agent, or Firm—Toren, McGeady, Stanger, Goldberg & Kiel

[57] ABSTRACT

A forage or picking harvester for the rough grinding of grain has a housing with a cylindrically shaped outer wall. A cutting blade wheel is located within the housing coaxial with the cylindrically shaped wall. The housing has an inlet and an outlet with a discharge duct forming the outlet and extending outwardly from the cylindrically shaped wall. Blades are mounted on the cutting blade wheel and extend radially of the axis of the wheel with the radially outer ends moving along a circle located at the inside surface of the cylindrically shaped wall. A comb-like arrangement of bearing arms is located within the discharge duct adjacent to the opening from the housing so that the blades on the cutting wheel hurl the grains against the bearing arms whereby the arms effect a rough grinding of the grain.

8 Claims, 4 Drawing Figures

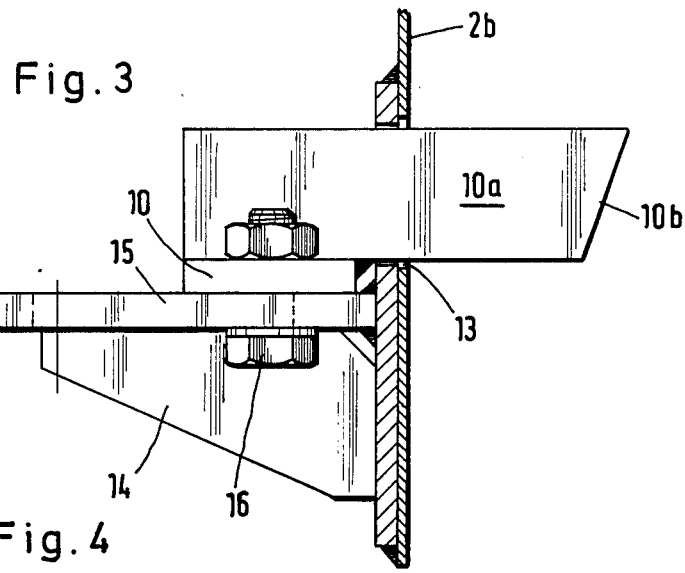
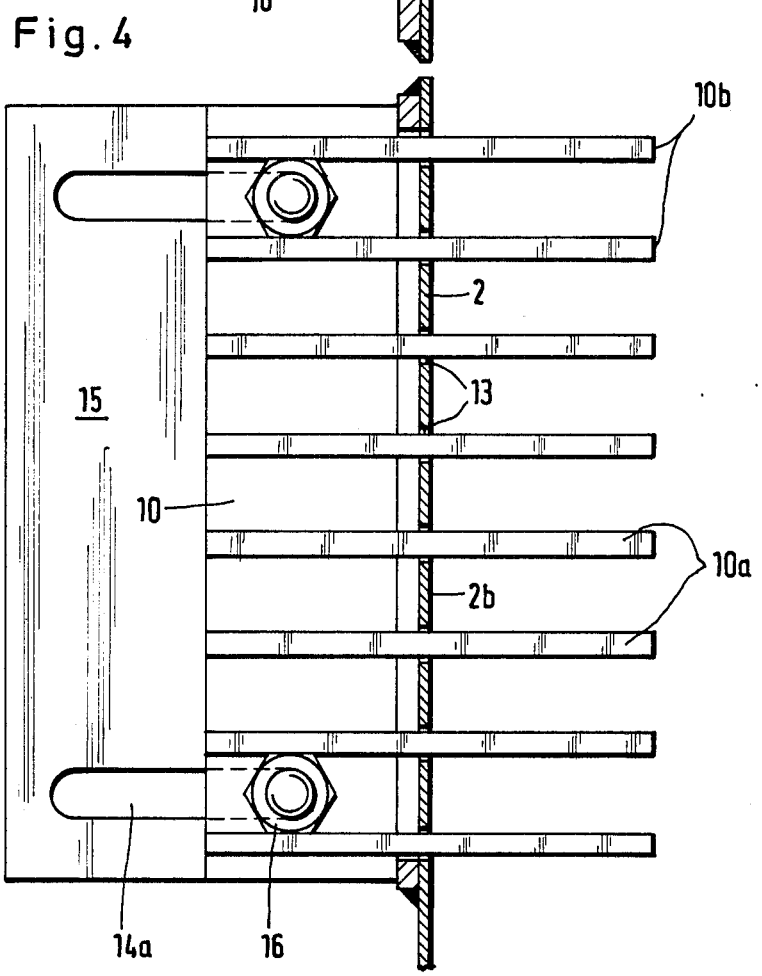

FORAGE OR PICKING HARVESTER

SUMMARY OF THE INVENTION

The present invention is directed to a forage or picking harvester, such as a flywheel cutter with blades located on a cutting blade wheel or a blower connected downstream of a forage chopper so that the blades or the blower are associated with a device for rough grinding of grain.

The harvesting and rough grinding of corn—and recently also of grain—is effected by mowing or picking choppers, whether for ensilage or as direct fodder, and has proved to be less effective than expected for processing the fodder material as compared to the very expensive working chain, combine harvester-crusher. The reason is that the grain crushing rate is too small in relation to the considerable expenditure for the parts and the energy needed for the additional grain crushing and rough grinding devices. To obtain the maximum use of the fodder material, the grain and possibly also the stalks or cobs, must be crushed while the remaining chopped material, such as straw and stems, as well as husks, are not crushed any further for many reasons.

In mowing and picking choppers, a known rough grinding device consists of a friction floor arranged at the retaining wall of a flywheel chopper with hammers located on a cutting blade wheel in addition to the blades and cooperating with the friction floor, note Switzerland patent 514 273. Even if larger friction floor surfaces are provided, the remaining chopped material, such as stalks, cobs, straw and husks, prevent the grain from gaining access to the friction floor surfaces so that only a relatively small portion of the grain is crushed.

In another rough grinding device, a replaceable sieve is positioned in the chopper outlet whereby the chopped material must continue to circulate in the chopper until the appropriate degree of crushing is achieved so that the grain passes through the sieve openings. Since the sieve openings must have a smaller dimension than the dimension of the grain for effective crushing of the grain, the remaining chopped material is partially pulverized and becomes lost when it is blown out of the outlet.

Moreover, both of these rough grinding devices require high driving power.

In view of the disadvantages of these known devices, recently it has been known to provide crushing rollers downstream of the chopper device, note German Offenlegungsschrift No. 30 00 946. This rough grinding device, however, is very expensive, since the output speed for the chopped material is decelerated with the aid of a conveying worm and the material must then be conveyed to the roller feed by an upwardly directed conveying device so that the roller feed then directs the chopped material to the crushing rollers in a free fall.

Therefore, the primary object of the present invention is to provide a less expensive rough grinding arrangement for forage and picking choppers which can be operated without additional driving power with a high grain crushing rate being achieved while retaining the cut structure of the other chopped materials.

In accordance with the present invention, in that part of the chopper where the radially outer ends of the blades move along a cylindrically shaped retaining wall, the blades pass a discharge duct directed out of the chopper with at least one comb-like arrangement of beating arms extending from the wall of the discharge duct so that the ends of the arms spaced from the wall are located approximately at the circle along which the blades move within the chopper.

In a surprising manner, the heavier grains, for the most part, initially separate from the radially outer ends of the blades as the blades move past the discharge duct. The heavier grains are located at the radially outer surface within the chopper housing due to the centrifugal force developed and the friction force generated at the inside surface of the housing along which the blades move. Accordingly, the heavier grains are hurled upwardly against the beating arms at a considerable speed. By contrast, the lighter, resilient particles of the chopped material traveling at a speed determined by the speed of the lower air current, do not reach the beating members and cannot interfere with the crushing of the grain. The reduction in speed of the ground grain is also advantageous, since the heavier grain particles have a higher acceleration than the remainder of the chopped material and would tend to rebound or to be thrown further and become lost due to the considerable speed at which they are conveyed into the harvesting carriage, particularly in flywheel choppers.

Additional rows of the beating arms can be located within the discharge duct so that the beating arms extend into the duct from opposite sides.

The beating arms can be mounted in the discharge duct so that they can be moved inwardly and outwardly and retained in a desired position.

In a preferred embodiment, brackets supporting a platform can be located on the outside surface of the discharge duct with the beating arm secured to the platform and extending inwardly into the discharge duct.

The ends of the beating arms located within the discharge duct adjacent the circle along which the cutting blades rotate can be provided with a curvature corresponding to the circular path of the radially outer ends of the blades.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is an enlarged view of detail A in FIG. 1; and

FIG. 4 is an enlarged view of detail B in FIG. 2.

DETAIL DESCRIPTION OF THE INVENTION

Figure 1:
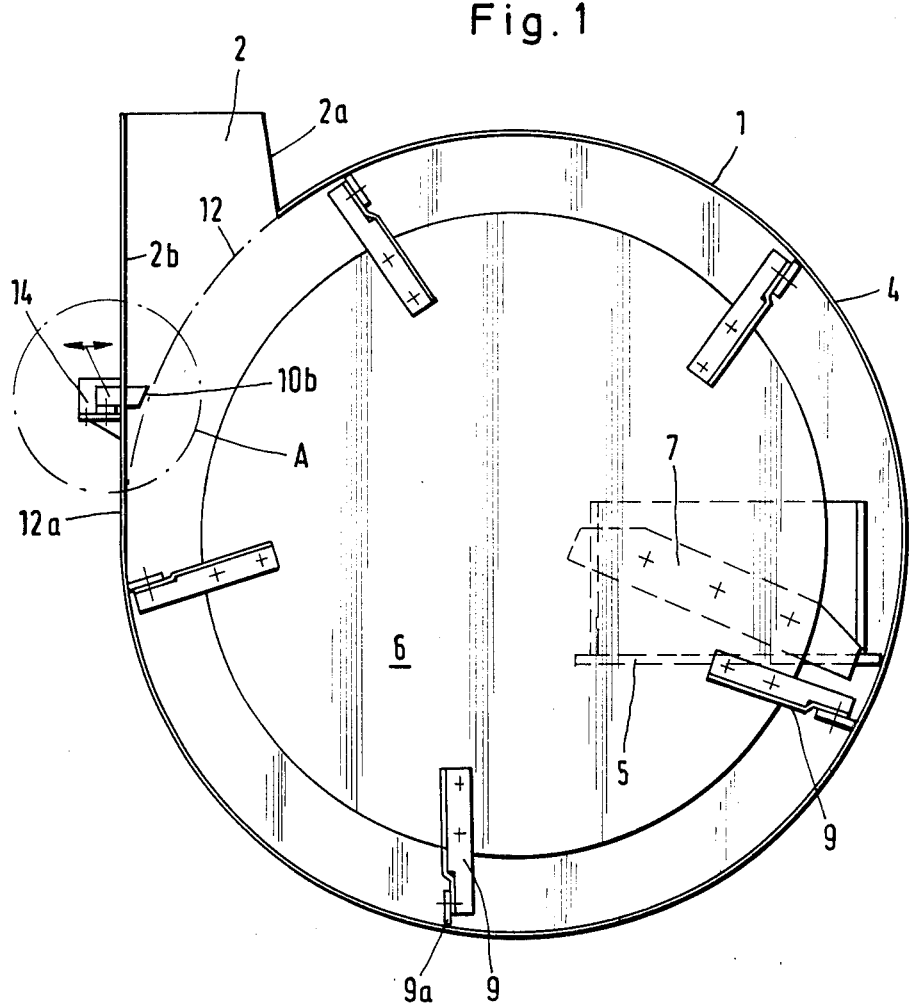
FIG. 1 is a diagrammatic view of a cutter within a flywheel cutter.
Figure 2:
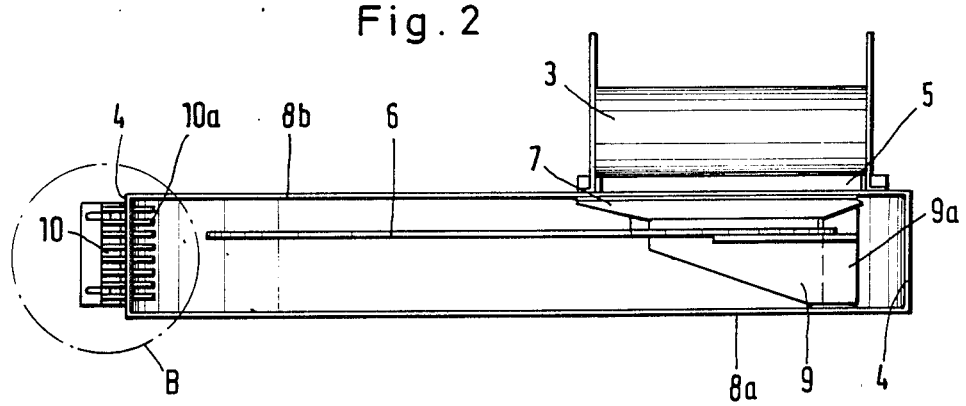
FIG. 2 is a top view of the cutter shown in FIG. 1.

The corn harvesting device illustrated in the drawings is a flywheel cutter or chopper including a cutter housing 1 with an ejection or discharge duct 2, note FIGS. 1 and 2, and an inlet or intake 3, note FIG. 2. The housing 1 includes a cylindrically shaped wall 4 forming the circumferential periphery of the housing. A fixed counter-cutting edge member 5 is located at the inlet 3. Cutting knives 7 are radially arranged around the cutting blade wheel 6 and cooperate with the counter-cutting edge member 5.

The circumferential periphery of the wheel 6 is spaced inwardly from the cylindrically shaped wall 4 and the wall 4 and wheel 6 are coaxially arranged within the housing 1. Blades 9 are located on the wheel 6 and extend between the wheel and the opposite side walls 8a, 8b of the housing 1. The blades 9 extend generally radially outwardly from the axis of the wheel 6 so that the radially outer ends of the blades travel along a circle 12 at the inside surface of the cylindrically shaped wall 4. The radially outer ends of the blades 9 are continous in the direction of the axis of the wheel 6 along the inside surface of the wall 4. The circle 12 is located at the radially inner end of the discharge duct 2 so that the radially outer ends of the blades sweep past the discharge duct as the wheel rotates.

Beating arms 10a are located within the discharge duct and are disposed in a comb-like arrangement 10, note FIG. 2. The discharge duct is formed, as viewed in FIG. 1, by two opposite walls 2a, 2b with the wall 2b extending tangentially relative to the circle 12. The discharge duct is completed by side walls extending between the opposed walls 2a, 2b. The wall 2a intersects the cylindrically shaped wall 4 at an angle and is inclined toward the wall 2b as it extends outwardly away from the housing 1. Slots 13 are formed in the wall 2b of the discharge duct 2 extending in the direction of the duct from the section 12a where the wall 2b intersects tangentially with the circle 12 and the cylindrically shaped wall 4.

As can be seen in FIG. 3, the sides of the blades extend in the direction of the discharge duct outwardly from the housing. Accordingly, the beating arms 10a can be adjustably positioned within the discharge duct 2. As the wheel 6 rotates clockwise, as viewed in FIG. 1, the heavy particles of the material chopped within the housing 1 move to the continuous radially outer ends 9a of the blades 9 along the inside surface of the cylindrically shaped wall 4 and, for the most part, are thrown outwardly from the housing by the blades 9 against the beating arms 10a. As the larger or heavier particles of the grain are thrown outwardly, the side edges of the beating arms 10a break the grain particles apart in a wedge-shaped manner.

While one row of beating arms 10a is illustrated in FIG. 1, multiple rows may be provided spaced apart in the direction of flow through the discharge duct. The beating arms can be mounted extending inwardly into the discharge duct from the walls 2a or 2b. As illustrated in FIGS. 1 and 3, the inner free ends of the beating arms 10a, located within the discharge duct, are shaped generally to conform to the circle 12 along which the radially outer ends 9a of the blade 9 move.

The comb-like arrangement 10 of the beating arms 10a is shown in detail in FIGS. 3 and 4. The comb-like arrangement 10 of the beating arms 10a is supported on the outside of the discharge duct 2 so that the position of the beating arms within the duct can be selected. A platform 15 is located on the outside of the discharge duct 2 and is supported on brackets 14. The comb-like arrangements of the beating arms is mounted on the platform 15 and the position of the beating arms is established by inserting bolts 16 through slotted holes 14a in the platform 15. By loosening the bolts 16, the length of the beating arms 10a extending into the discharge duct 2 can be selected or, if necessary, by removing the bolts the comb-like arrangement 10 can removed from the discharge duct.

The arrangement for effecting rough grinding of the grain can be effected in a similar manner within an ejecting blower.

While specific embodiments of the invention have been shown and described in detail to illustrate the application of the inventive principles, it will be understood that the invention may be embodied otherwise without departing from such principles.

I claim:

1. Forage or picking harvester, such as a flywheel cutter, for the rough grinding of grain, comprising a housing having an inlet and an outlet spaced on said housing from said inlet, a cutting blade wheel located within said housing and rotating about a horizontal axis extending through said housing, wherein the improvement comprises that said housing has a cylindrically shaped wall extending around the axis of said cutting blade wheel and defining the circumferential periphery of said housing, said outlet comprises a discharge duct projecting upwardly and outwardly from said cylindrically shaped wall with the opening into said discharge duct located through said cylindrically shaped wall, a plurality of blades mounted in angularly spaced relation on said cutting blade wheel and extending generally radially of the axis thereof with the radially outer ends of said blades being continuous in the direction of the axis of said cutting blade wheel for the full width of each blade and moving along a circle located at the inner surface of said cylindrically shaped wall so that the radially outer ends move upwardly past the opening into said discharge duct, said discharge duct having a first wall extending upwardly and outwardly from the circumferential periphery of said housing and with the surface of said first wall facing into said discharge duct facing toward the circumferential periphery of said housing, at least one comb-like arrangement of laterally spaced bearing arms mounted in said first wall of said discharge duct with said beating arms extending from said first wall to approximately the circle along which the radially outer ends of said blades move and spaced closely outwardly from the circle so that grain carried by the radially outer ends of said blades is directed into said discharge duct against said beating arms, said beating arms having upwardly extending flat side surfaces extending generally parallel to one another and to the flow through said discharge duct, slots extending in the direction of said discharge duct conveying flow of said housing are located in said first wall, and said beating arms extend through said slots from the exterior of said discharge duct into said discharge duct and the length of said beating arms being adjustably positionable within said discharge duct, and means located on the exterior of said discharge duct for securing said beating arms in position.

2. Forage or picking harvester, as set forth in claim 1, wherein said discharge duct includes a second wall spaced opposite said first wall and extending outwardly from said cylindrically shaped wall, and a second comb-like arrangement of beating arms extending through said second wall into said discharge duct with said second comb-like arrangement spaced from said comb-like arrangement extending through said first wall.

3. Forage or picking harvester, as set forth in claim 2, wherein said first wall of said discharge duct extends tangentially relative to said cylindrically shaped wall of said housing and said second wall converges toward said first wall as it extends upwardly and outwardly away from said cylindrically shaped wall.

4. Forage or picking harvester, as set forth in claim 1, wherein said housing having a pair of opposite side walls disposed in spaced relation and extending across the opposite ends of said cylindrically shaped wall, said cutting blade wheel disposed in spaced relation to said side walls and spaced radially inwardly from said cylindrically shaped wall, and said blades secured to the opposite sides of said cutting blade wheel and extending from said cutting blade wheel to the adjacent said side wall.

5. Forage or picking harvester, as set forth in claim 1, wherein slots are formed in said first wall of said discharge duct with said slots being elongated in the direction of flow out of said discharge duct from said housing, brackets secured to the outside surface of said first wall, a platform mounted on said brackets, said comb-like arrangement of beating arms supported on said platform and extending through said slots into said discharge duct, second slots formed in said platform, and bolts extendable through said comb-like arrangement of beating arms and through said second slots for selectively positioning said beating arms within said discharge duct.

6. Forage or picking harvester, as set forth in claim 1, wherein at least two rows of said comb-like arrangement of beating arms are located in said discharge duct with said rows spaced apart in the flow direction out of said discharge duct from said housing.

7. Forage or picking harvester, as set forth in claim 1, wherein each said beating arm has a free end located within said discharge duct spaced inwardly from said first wall and the free end of each said beating arm is shaped to correspond to the adjacent path of the radially outer ends of said blades moving along a circle located at the inner surface of said cylindrically shaped wall.

8. Forage or picking harvester, as set forth in claim 1, including cutting means located at said inlet into said housing for cutting the material entering said housing.

* * * * *